(12) United States Patent
Tseng et al.

(10) Patent No.: US 9,459,745 B2
(45) Date of Patent: Oct. 4, 2016

(54) CAPACITIVE TOUCH PANEL AND ELECTRODE SET THEREOF

(71) Applicant: ELAN MICROELECTRONICS CORPORATION, Hsin Chu (TW)

(72) Inventors: Yao-Chin Tseng, Hsin Chu (TW); Chih-Chung Hung, Hsin Chu (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 98 days.

(21) Appl. No.: 14/478,190

(22) Filed: Sep. 5, 2014

(65) Prior Publication Data

US 2015/0092121 A1    Apr. 2, 2015

Related U.S. Application Data

(60) Provisional application No. 61/884,147, filed on Sep. 30, 2013.

(30) Foreign Application Priority Data

Oct. 29, 2013 (TW) .............................. 102139042 A (51) Int. Cl.
*G06F 3/044* (2006.01)
*G06F 3/045* (2006.01)
*G06F 3/041* (2006.01)

(52) U.S. Cl.
CPC .................................... *G06F 3/044* (2013.01)

(58) Field of Classification Search
CPC .............................. G06F 3/044; H01L 51/5203
See application file for complete search history.

(56) References Cited

U.S. PATENT DOCUMENTS

| | | | | |
|---|---|---|---|---|
| 2007/0247443 A1* | 10/2007 | Philipp | ................... | G06F 3/045 345/173 |
| 2010/0295813 A1* | 11/2010 | Kent | ...................... | G06F 3/044 345/174 |
| 2012/0206401 A1* | 8/2012 | Lin | ......................... | G06F 3/044 345/174 |
| 2013/0293507 A1* | 11/2013 | Singh | ...................... | G06F 3/044 345/174 |
| 2014/0042410 A1* | 2/2014 | Chen | ................... | H01L 51/5203 257/40 |
| 2014/0152580 A1* | 6/2014 | Weaver | .................. | G06F 3/041 345/173 |
| 2014/0204050 A1* | 7/2014 | Huang | ................... | G06F 3/044 345/174 |

* cited by examiner

*Primary Examiner* — Lin Li
(74) *Attorney, Agent, or Firm* — patenttm.us (57) ABSTRACT

A capacitive touch panel has multiple electrode couples formed on a substrate. Each electrode couple has multiple first electrodes and multiple second electrodes. Each of the first electrode and the second electrode has three traces. Each end of one of the three traces is connected to one end of one of the other two traces. The three traces of the first electrode and the three traces of the second electrode are alternately arranged. Given the foregoing layout of the electrode couples, the first electrodes and the second electrodes have symmetrical capacitance values and resistance values. Accordingly, the capacitive touch panel has an enhance signal-to-noise ratio and an anti-interference capability.

14 Claims, 11 Drawing Sheets

CAPACITIVE TOUCH PANEL AND ELECTRODE SET THEREOF

CROSS-REFERENCE TO RELATED APPLICATIONS

This application claims the benefit of Taiwan patent application no. 102139042, filed on Oct. 29, 2013 and U.S. provisional application No. 61/884,147, filed on Sep. 30, 2013, the disclosures of which are incorporated herein in their entirety by reference.

BACKGROUND OF THE INVENTION

1. Field of the Invention

The present invention relates to a capacitive touch panel and an electrode set thereof, and more particularly to a capacitive touch panel having symmetrical capacitive and resistive values, satisfactory signal-to-noise ratio (SNR) and interference withstand capability.

2. Description of the Related Art

Figure 7:
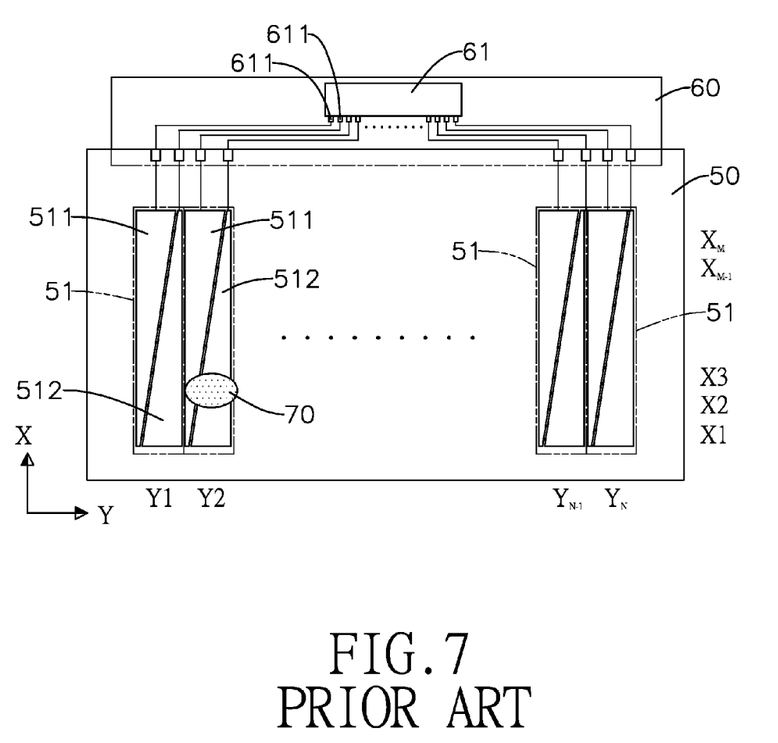
FIG. 7 is a schematic view of a first conventional one-dimensional single layer capacitive touch panel.

With reference to FIG. 7, a first conventional one-dimensional single layer capacitive touch panel has a substrate 50, an Indium Tin Oxide (ITO) electrode set and a flexible control board 60. The ITO electrode set is formed on the substrate 50 and has multiple electrode couples 51. Each electrode couple 51 has a first electrode 511 and a second electrode 512. The flexible control board 60 is connected to one side of the substrate 50 and has a controller 61 formed thereon. The controller 61 has multiple signal terminals 611 electrically connected to the respective first electrodes 511 and the second electrodes 512 of the electrode couples 51 for scanning and locating an object 70 on the substrate 50.

As for a method performed by the flexible control board 60 to detect object 70 on the substrate, a U.S. Pat. No. 8,121,283, entitled "Tapered capacitive sensing structure", discloses that each of the first electrode 511 and the second electrode 512 of one of the electrode couples 51 covered by the object 70 generates a capacitance value with respect to the ground when the object 70 touches the substrate 50. As areas of the first electrode 511 and the second electrode 512 corresponding to the object 70 are different, the capacitance values generated by the first electrode 511 and the second electrode 512 also differ from each other. For example, when the electrode couple 51 touched by the object 70 at a coordinate Y2 in a Y axis generates a capacitive value, the coordinate in the Y axis of the object 70 can be determined as Y2. Furthermore, as the capacitance value of the second electrode 512 is greater than that of the first electrode 511 and a ratio between the sensing values of the first electrode 511 and the second electrode 512 can reflect an X coordinate of the object 70 on the electrode couple 51, the X coordinate of the object 70 can be determined as X2. The two-dimensional coordinates (Y2, X2) of the object 70 can thus be obtained.

Figure 8:
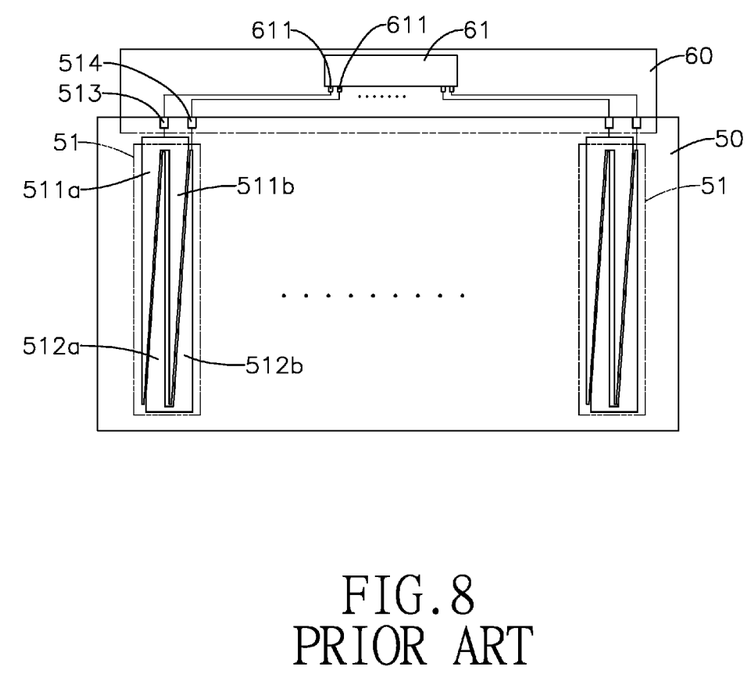
FIG. 8 is a schematic view of a second conventional one-dimensional single layer capacitive touch panel.

With reference to FIG. 8, a second conventional one-dimensional single layer capacitive touch panel differs from the foregoing conventional capacitive touch panel in higher sensing accuracy. The first electrode 511 of each electrode couple 51 has two tapered traces 511a, 511b. The second electrode 512 of the electrode couple 51 has two tapered traces 512a, 512b. Wide ends of the two tapered traces 511a, 511b of the first electrode 511 are connected, and a signal terminal 513 is formed on a connected portion of the wide ends of the two tapered traces 511a, 511b of the first electrode 511. Wide ends of the two tapered traces 512a, 512b of the second electrode 512 are connected, and another signal terminal 514 is formed on a narrow end of one of two tapered traces 512b of the second electrode 512. The signal terminals 513, 514 are respectively connected to the signal terminals 611 of the controller 61 on the flexible control board 60.

Figure 9:
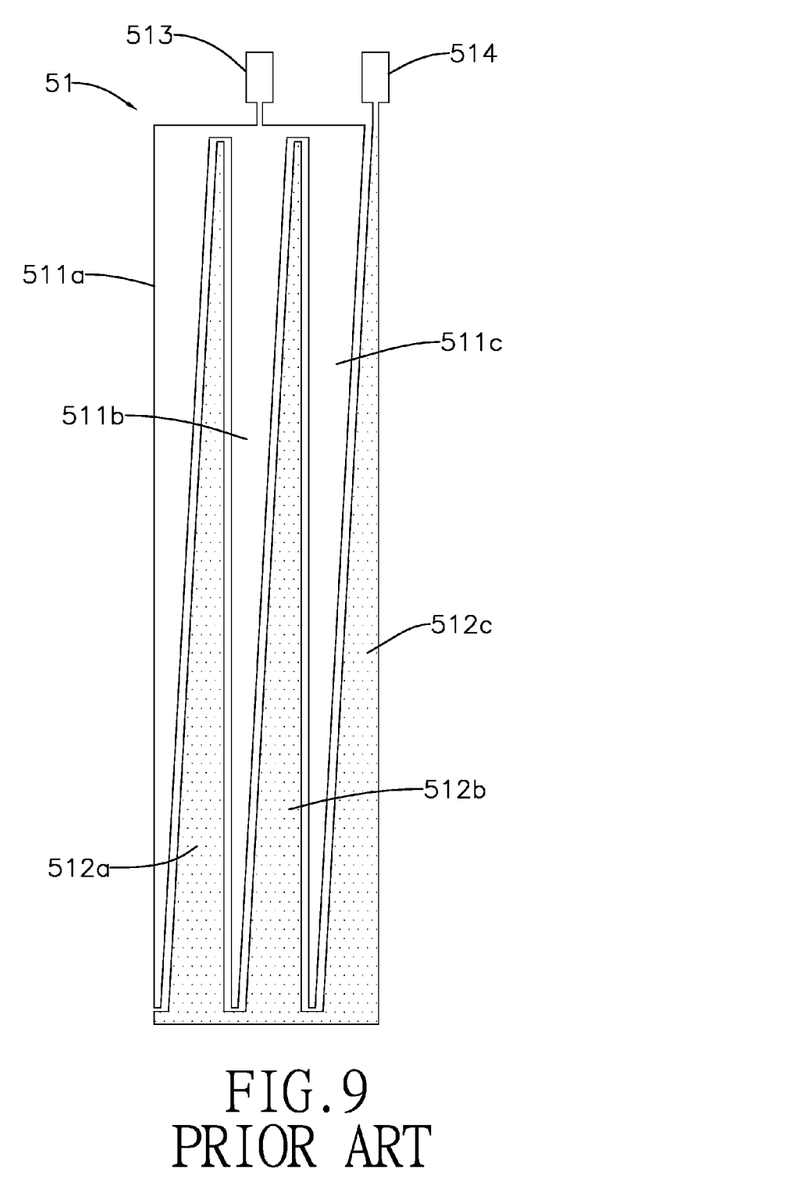
FIG. 9 is a schematic view of an electrode couple of a third conventional one-dimensional single layer capacitive touch panel.

As the first electrode 511 and the second electrode 512 of each electrode couple 51 have more conductive traces, the sensing accuracy of the one-dimensional single layer capacitive touch panel is enhanced. Currently, each of the first electrode 511 and the second electrode 512 can be developed to provide up to three tapered traces. With reference to FIG. 9, each of the first electrode 511 and the second electrode 512 of each electrode couple 51 has three tapered traces 511a~511c, 512a~512c. Wide ends of the tapered traces 511a~511c of the first electrode are connected, and a signal terminal 513 is formed on a connected portion of the wide ends of the three tapered traces 511a~511c of the first electrode 511. Wide ends of the three tapered traces 512a~512c of the second electrode 512 are connected, and another signal terminal 514 is formed on a narrow end of outmost one 512c of the three tapered traces of the second electrode 512.

Figure 10:
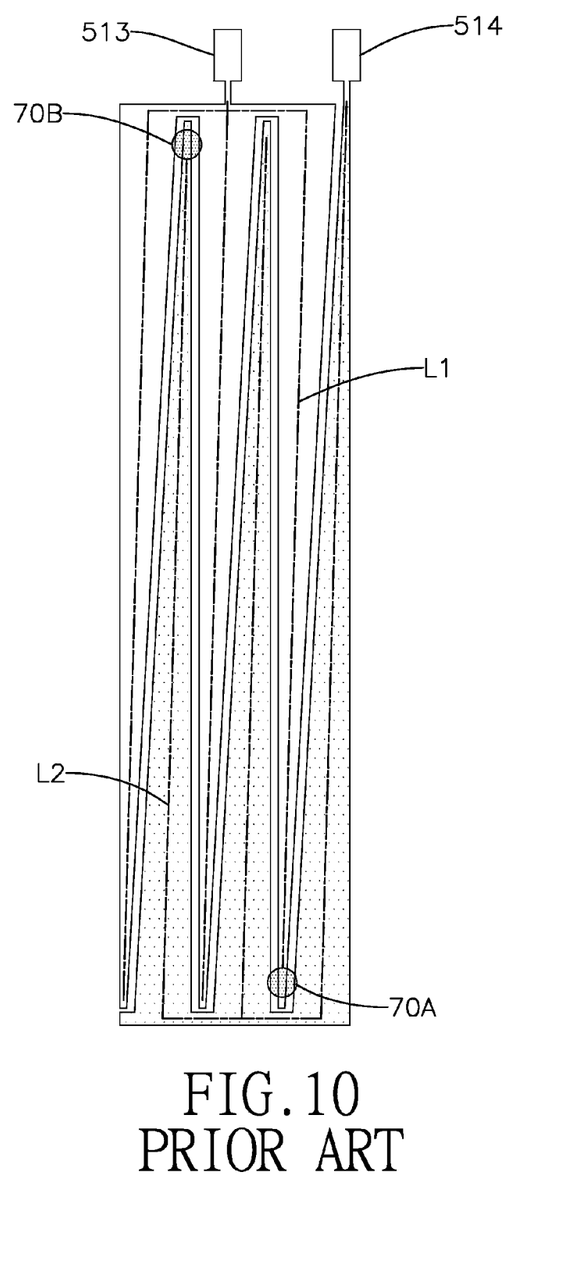
FIG. 10 is a schematic view showing a signal transmission path of the electrode couple in FIG. 9.

Although enabling one-dimensional single layer touch panel to have enhanced sensing accuracy, the foregoing electrode structures are noise-prone in determining coordinates of objects on the touch panel. Because the tapered traces 511a~511c, 512a~512c of the first electrode 511 and the second electrode 512 are formed of Indium Tin Oxide (ITO) and the material of ITO has an internal resistance, a length of signal transmission path in the tapered traces 511a~511c, 512a~512c directly affects sensed capacitance and resistance thereof. With reference to FIG. 10, given two locations of objects 70A, 70B marked on the electrode couple 51 as an example, a path L1 from the signal terminal 513 to one of the objects 70A is shorter than another path L2 from the signal terminal 514 to the other object 70B. Under the circumstance, the resistance of the path L1 (measured at approximately 20.5Ω) almost doubles the resistance of the path L2 (measured at approximately 10.7Ω). In other words, the capacitance and resistance of the first electrode 511 and the second electrode 512 are asymmetrical. Thus, location determination of touch object is error-prone due to noise when the first electrode 511 and the second electrode 512 are charged or discharged.

Figures 11A, 11B:
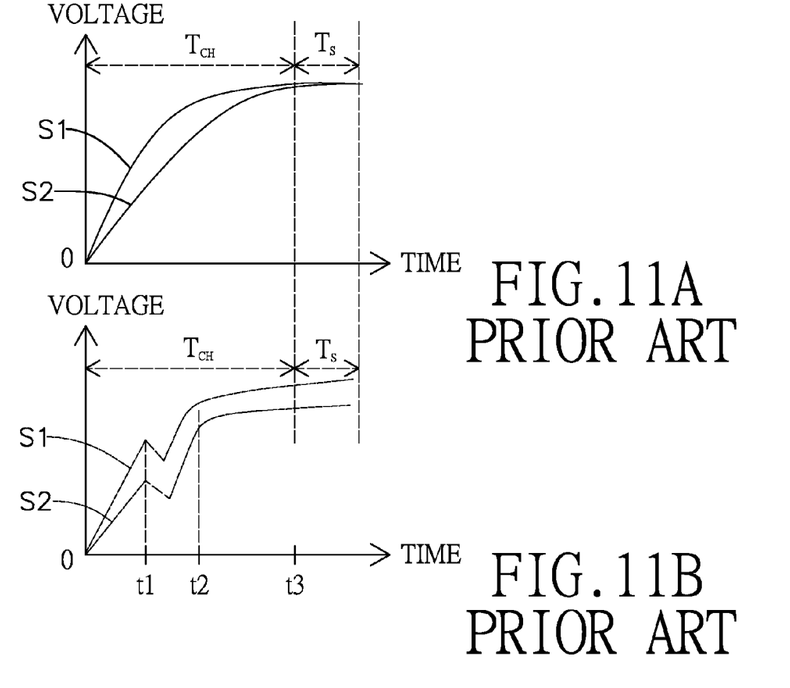
FIGS. 11A, 11B are waveform diagrams associated with the electrode couple in FIG. 9.

With reference to FIG. 11A, a period for signal terminals to output scan signals includes a charge time $T_{CH}$ and a sense time $T_S$. The charge time $T_{CH}$ of the first electrode 511 and the second electrode 512 is defined between when the first electrode 511 and the second electrode 512 are initially charged and fully charged. Sensed capacitance values S1, S2 of the first electrode 511 and the second electrode 512 are read during the sense time $T_S$ right after the charge time $T_{CH}$ expires. Hence, as long as the charge time $T_{CH}$ is long enough, despite the differences in capacitance and resistance between the first electrode 511 and the second electrode 512, the sensed capacitance can still be read successfully when the first electrode 511 and the second electrode 512 are fully charged. However, with reference to FIG. 11B, if the touch panel is subjected to noise interference during the charging processes of the first electrode 511 and the second electrode 512, the differences in capacitance and resistance will affect an actual full charge time of the first electrode 511 and the second electrode 512. As a result of the differences in capacitance and resistance, the sensed capacitance values S1, S2 read during the sense time $T_S$ are not proportional to each other and false identification of coordinates of objects on the touch panel becomes inevitable. Since the most direct noise source of touch panels comes from interfered scan signals of a liquid crystal display (LCD) touch panel, the possibility for the foregoing false identification to take place is rather high. Effective solution should be addressed to tackle the asymmetrical capacitance and resistance of the first electrode and the second electrode.

SUMMARY OF THE INVENTION

An objective of the present invention is to provide a capacitive touch panel and an electrode couple thereof with symmetrical capacitive and resistive values, satisfactory signal-to-noise ratio (SNR) and interference withstand capability.

To achieve the foregoing objective, the electrode couple is applied to a capacitive touch panel and has a first electrode and a second electrode.

The first electrode has a first trace, a second trace and a third trace. The first trace has a first end and a second end. The second trace has a first end and a second end. The first end of the second trace is connected to the first end of the first trace. The third trace has a first end and a second end. The second end of the third trace is connected to the second end of the first trace.

The second electrode has a fourth trace, a fifth trace and a sixth trace. The fourth trace has a first end and a second end. The fifth trace has a first end and a second end. The second end of the fifth trace is connected to the second end of the fourth trace. The sixth trace has a first end and a second end. The first end of the sixth trace is connected to the first end of the fourth trace.

The first trace, the second trace, the third trace of the first electrode and the fourth trace, the fifth trace and the sixth trace of the second electrode are alternately arranged in a way that the first ends of the first trace, the second trace, the third trace and the second ends of the fourth trace, the fifth trace and the sixth trace are located on a same side of the capacitive touch panel and the second ends of the first trace, the second trace, the third trace and the first ends of the fourth trace, the fifth trace and the sixth trace are located on another same side of the capacitive touch panel.

To achieve the foregoing objective, the capacitive touch panel has a substrate, at least one electrode couple and a control module.

The substrate has a first side portion.

Each one of the at least one electrode couple has multiple first electrodes and multiple second electrodes.

The first electrodes are formed on the substrate and each first electrode has a first trace, a second trace and a third trace.

The first trace has a wide end and a narrow end.

The second trace has a wide end and a narrow end. The wide end of the second trace is connected to the wide end of the first trace through a first connection segment.

The third trace has a wide end and a narrow end. The narrow end of the third trace is connected to the narrow end of the first trace.

The second electrodes are formed on the substrate and each second electrode has a fourth trace, a fifth trace and a sixth trace.

The fourth trace has a wide end and a narrow end.

The fifth trace has a wide end and a narrow end. The narrow end of the fifth trace is connected to the narrow end of the fourth trace through a fourth connection segment.

The sixth trace has a wide end and a narrow end. The wide end of the sixth trace is connected to the wide end of the fourth trace through a third connection segment.

The first trace, the second trace, the third trace of the first electrode and the fourth trace, the fifth trace and the sixth trace of the second electrode are alternately arranged, and the first connection segment and the fourth connection segment are located on the first side portion of the substrate and the second connection segment and the third connection segment are located on the substrate and are opposite to the first side portion of the substrate.

The control module has multiple signal terminals respectively and electrically connected to the first electrodes and the second electrodes of the at least one electrode couple.

The foregoing capacitive touch panel and the electrode couple thereof employ the concept of using three traces for each of the first electrode and the second electrode. Each end of one of the three traces is connected to one end of one of the other two traces such that the first electrodes and the second electrodes have symmetrical capacitance values and resistance values, which can withstand interference, resolve the problem of false identification of coordinates and provide a better SNR.

Other objectives, advantages and novel features of the invention will become more apparent from the following detailed description when taken in conjunction with the accompanying drawings.

DETAILED DESCRIPTION OF THE INVENTION

Figure 1:
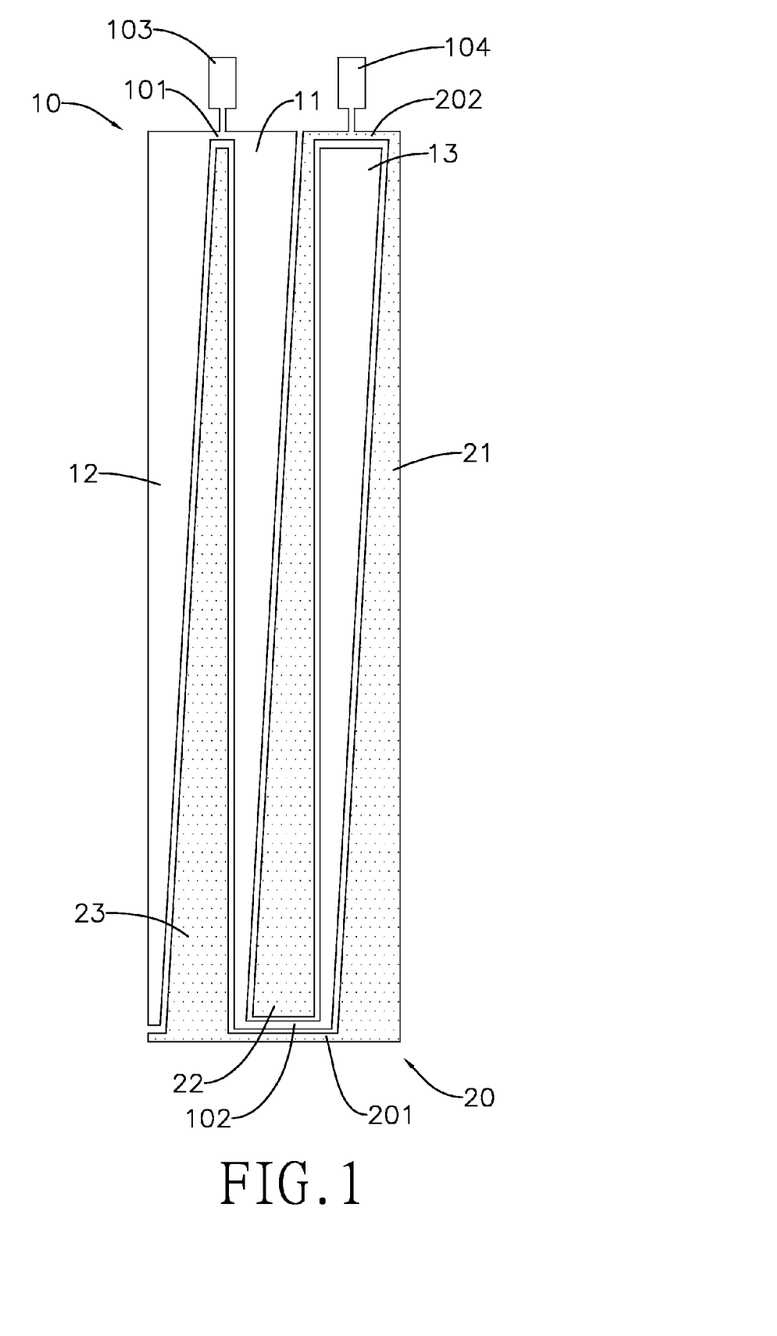
FIG. 1 is a schematic view of an electrode couple in accordance with the present invention.

With reference to FIG. 1, an electrode couple in accordance with the present invention has at least one first electrode 10 and at least one second electrode 20.

In the present embodiment, each one of the at least one first electrode 10 includes three traces, namely, a first trace, a second trace and a third trace 11~13. Each of the first trace, the second trace and the third trace 11~13 has a first end and a second end. The first trace, the second trace and the third trace 11~13 are triangular and progressively decrease in width from the first end to the second end. Hence, the first end is a wide end and the second end is a narrow end. Each of the first trace, the second trace and the third trace 11~13 has a sloped side and a straight side. The first trace, the second trace and the third trace 11~13 are arranged side by side with the straight sides thereof parallel to one another.

In the present embodiment, the first trace 11 of the first electrode 10 is centrally located, and the second trace 12 and the third trace 13 are respectively located next to the straight side and the sloped side of the first trace 11. The first end of the first trace 11 is connected to the first end of the second trace 12 through a first connection segment 101. A signal terminal 103 is formed on the first connection segment 101. The second end of the first race 11 is connected to the second end of the third trace 13 through a second connection segment 102.

Each one of the at least one second electrode 20 also includes three traces, namely, a fourth trace, a fifth trace and a sixth trace 21~23. Each of the fourth trace, the fifth trace and the sixth trace 21~23 has a first end and a second end. The fourth trace, the fifth trace and the sixth trace 21~23 are triangular and progressively decrease in width from the first end to the second end. Hence, the first end is a wide end and the second end is a narrow end. Each of the fourth trace, the fifth trace and the sixth trace 21~23 has a sloped side and a straight side. The fourth trace, the fifth trace and the sixth trace 21~23 are arranged side by side with the straight sides thereof parallel to one another.

In the present embodiment, the fifth trace 22 of the second electrode 20 is centrally located, and the fourth trace 21 and the sixth trace 23 are respectively located next to the straight side and the sloped side of the fifth trace 22. The first end of the fourth trace 21 is connected to the first end of the sixth trace 23 through a third connection segment 201. The second end of the fourth race 21 is connected to the second end of the fifth trace 22 through a fourth connection segment 202. A signal terminal 104 is formed on the fourth connection segment 202. The signal terminal 104 of the second electrode 20 and the signal terminal 103 of the first electrode 10 are located on a first side.

The fourth trace to the sixth trace 21~23 of the second electrode 20 and the first trace to the third trace 11~13 of the first electrode 10 are alternately arranged. The fourth trace 21 of the second electrode 20 and the third trace 13 of the first trace 10 are adjacent to each other with the sloped sides thereof parallel to each other. The fifth trace 22 of the second electrode 20 and the first trace 11 of the first trace 10 are adjacent to each other with the sloped sides thereof parallel to each other. The sixth trace 23 of the second electrode 20 and the second trace 12 of the first trace 10 are adjacent to each other with the sloped sides thereof parallel to each other. The first connection segment 101 and the fourth connection segment 202 are located on the first side. The second connection segment 102 and the third connection segment 201 are located on a second side opposite to the first side.

Figure 2:
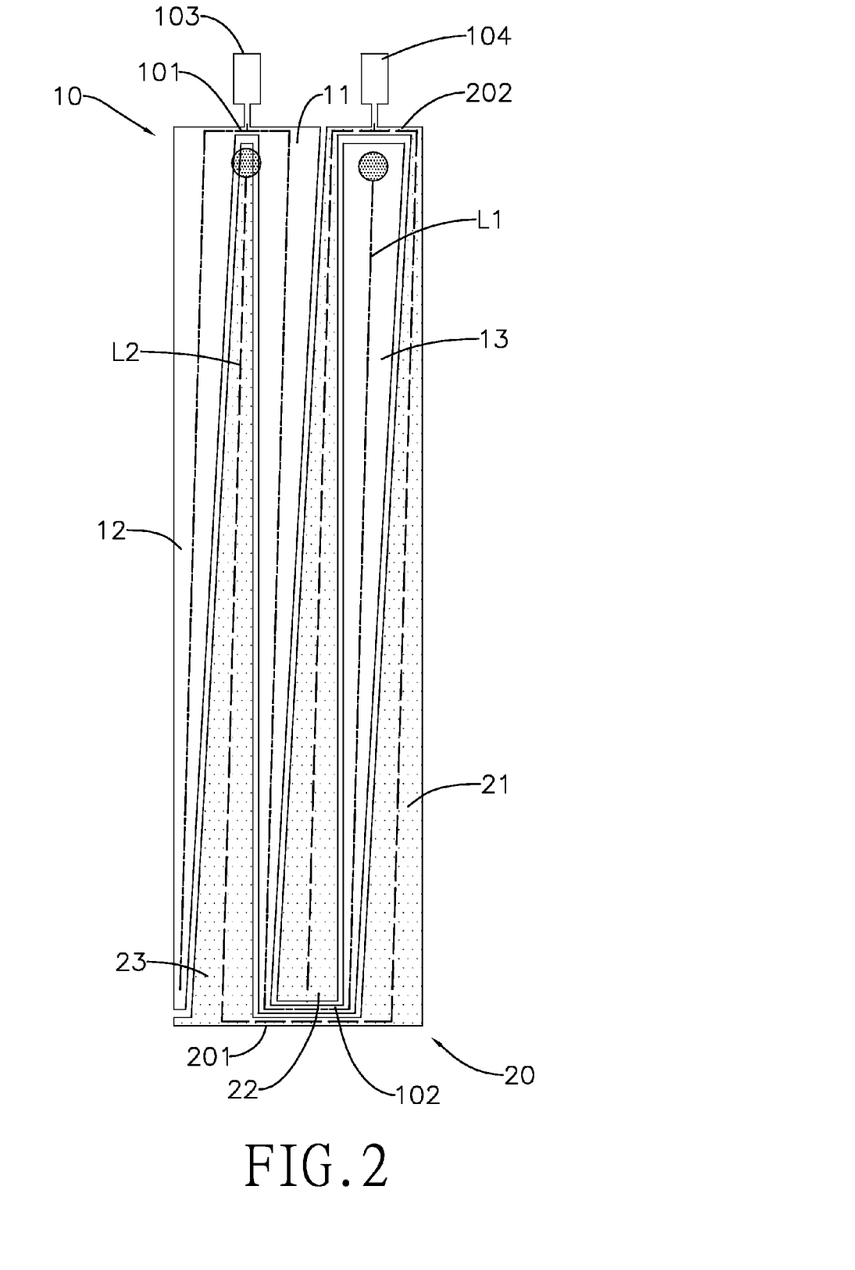
FIG. 2 is a schematic view showing a signal transmission path of the electrode couple in FIG. 1.

Given the foregoing electrode couple structure, the capacitance and resistance of the first electrode 10 and the second electrode 20 are symmetrical. With reference to FIG. 2, signal transmission paths of the signal terminals 103 transmitting signals through the first trace to the third trace 11~13 and signal transmission paths of the signal terminal 104 transmitting signals through the fourth trace to the sixth trace 21~23 are shown. A longest one L1 of the signal transmission paths of the signal terminal 103 goes from the wide end of the first trace 11 to the wide end of the third trace 13. A longest one L2 of the signal transmission paths of the signal terminal 104 goes from the narrow end of the fourth trace 21 to the narrow end of the sixth trace 23. It can be seen that the transmission paths L2 and L1 are about the same in distance. According to actual measurement, the resistance values of the transmission path L2, L1 are respectively 21.0 KΩ and 20.8 KΩ. In view of the approximately identical resistance values of the two transmission paths L1, L2, the first electrode 10 and the second electrode 20 have symmetrical capacitance and resistance and therefore have better anti-interference capability against noise.

Figure 3A:
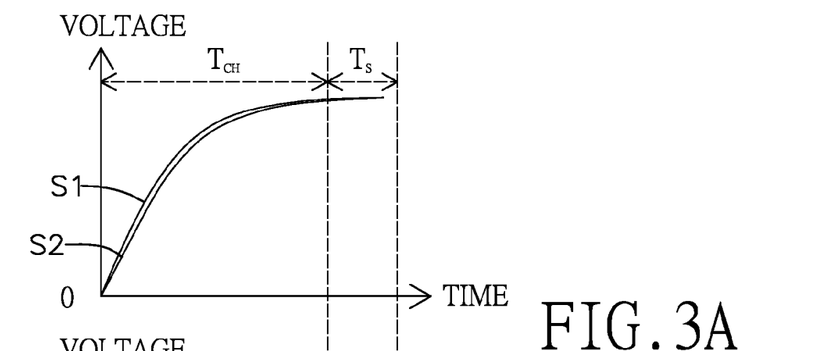
FIGS. 3A, 3B are waveform diagrams associated with scan signals of the electrode couple in FIG. 1.
Figure 3B:
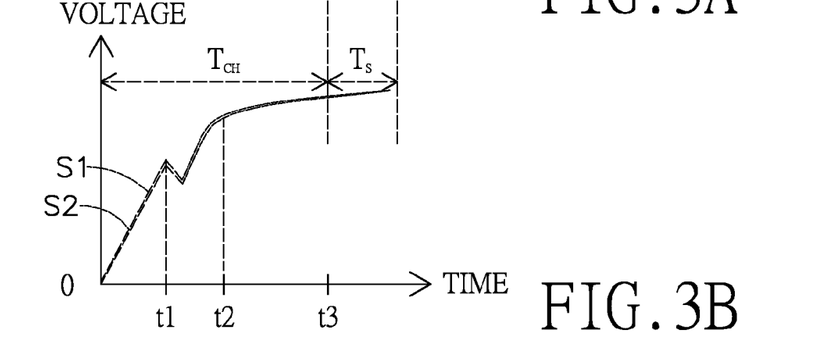

Since the capacitance and resistance of the signal transmission paths of the first electrode 10 and the second electrode 20 are close to each other, charging curves S1, S2 associated with the first electrode 10 and the second electrode 20 are shown in FIG. 3A. Quasi-saturation capacitance values of the first electrode 10 and the second electrode 20 can be read within a sense time $T_S$. Suppose that a noise occurs within a charge time $T_{CH}$. The sensed capacitance values of the first electrode 10 and the second electrode 20 drop upon the occurrence of the noise. Given noises generated by scan signals of an LCD touch panel as an example illustrated in FIG. 3B, sensed capacitance values of the first electrode 10 and the second electrode 20 simultaneously drop upon the occurrence of a noise. However, because of matching capacitance and resistance of the first electrode 10 and the second electrode 20, the first electrode 10 and the second electrode 20 can still be nearly fully charged during the sense time $T_S$ and the sensed capacitance values of the first electrode 10 and the second electrode 20 are proportional to each other such that false identification of coordinates of objects can be avoided.

Figure 4:
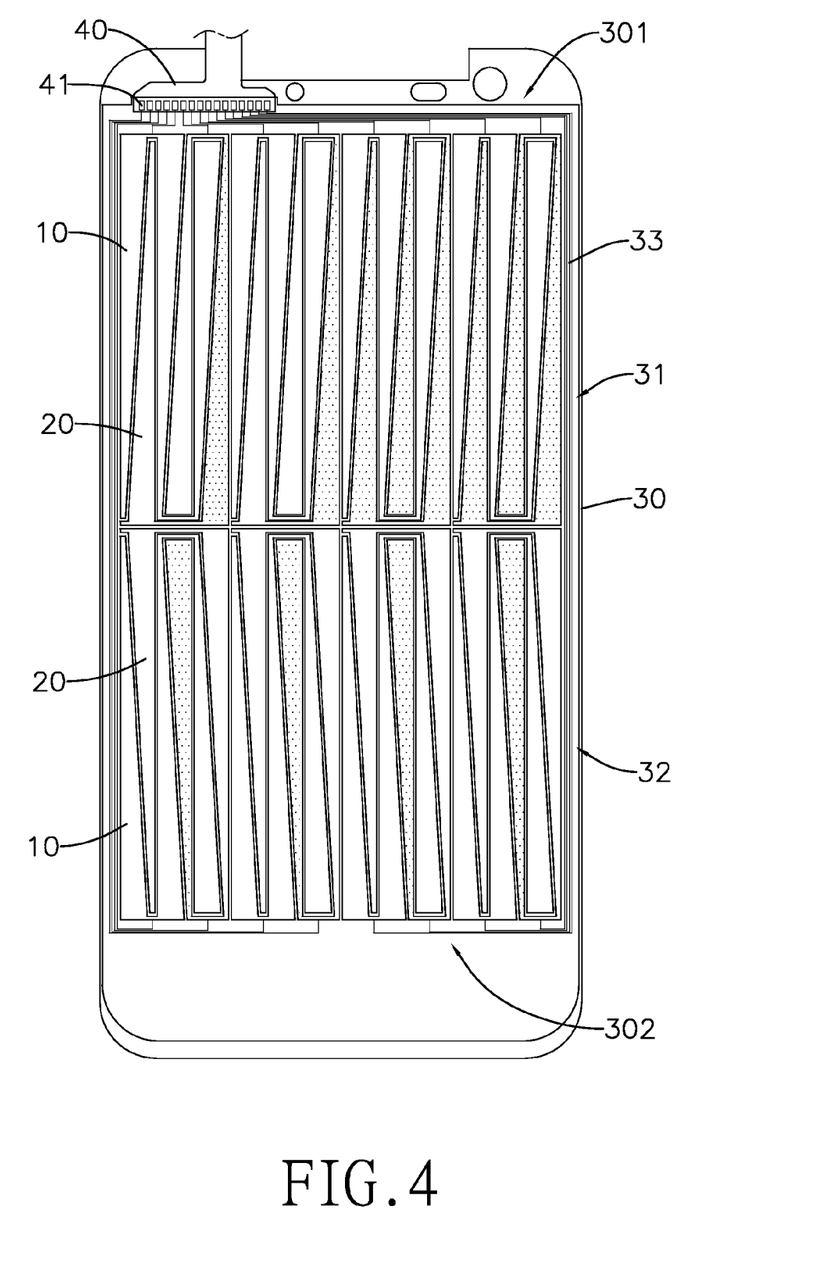
FIG. 4 is a schematic view of a capacitive touch panel having multiples of the electrode couples in FIG. 1.

With reference to FIG. 4, a capacitive touch panel in accordance with the present invention employs the foregoing electrode couple structure and has a substrate 30, multiple electrode couples and a control module 40. In the present embodiment, the capacitive touch panel is a one-dimensional single layer capacitive touch panel. The substrate 30 has a surface. The electrode couples are formed on the surface of the substrate 30.

The substrate 30 is rectangular and has a first side portion 301, a second side portion 302 and multiple sensing areas. The first side portion 301 is formed along a first side of the substrate 30 in a width direction of the substrate 30. The second side portion 302 is formed along a second side of the substrate 30 opposite to the first side. Each sensing area is formed between the first side portion 301 and the second side portion 302. An electrode couple is formed on each sensing area. In the present embodiment, the substrate 30 has two sensing areas 31, 32 hereinafter named as a first sensing area and a second sensing area 31, 32 and sequentially formed between the first side portion 301 and the second side portion 302. The first sensing area 31 and the second sensing area 32 are arranged vertically from a top to a bottom of the substrate 30 in a length direction of the substrate 30. An electrode couple is formed on each of the first sensing area 31 and the second sensing area 32. Each electrode couple has multiple first electrodes 10 and multiple second electrodes 20 formed on the surface of the substrate 30. It should be pointed out that to facilitate understanding of the electrode couple structure within the sensing area, the quantities of the first electrode 10 and the second electrode 20 of the electrode couples formed inside the first sensing area 31 and the second sensing area 32 purely serve for the purpose of illustration and should be treated as a limitation of choices of the quantities of the first electrode 10 and the second electrode 20 physically implemented.

Figure 5:
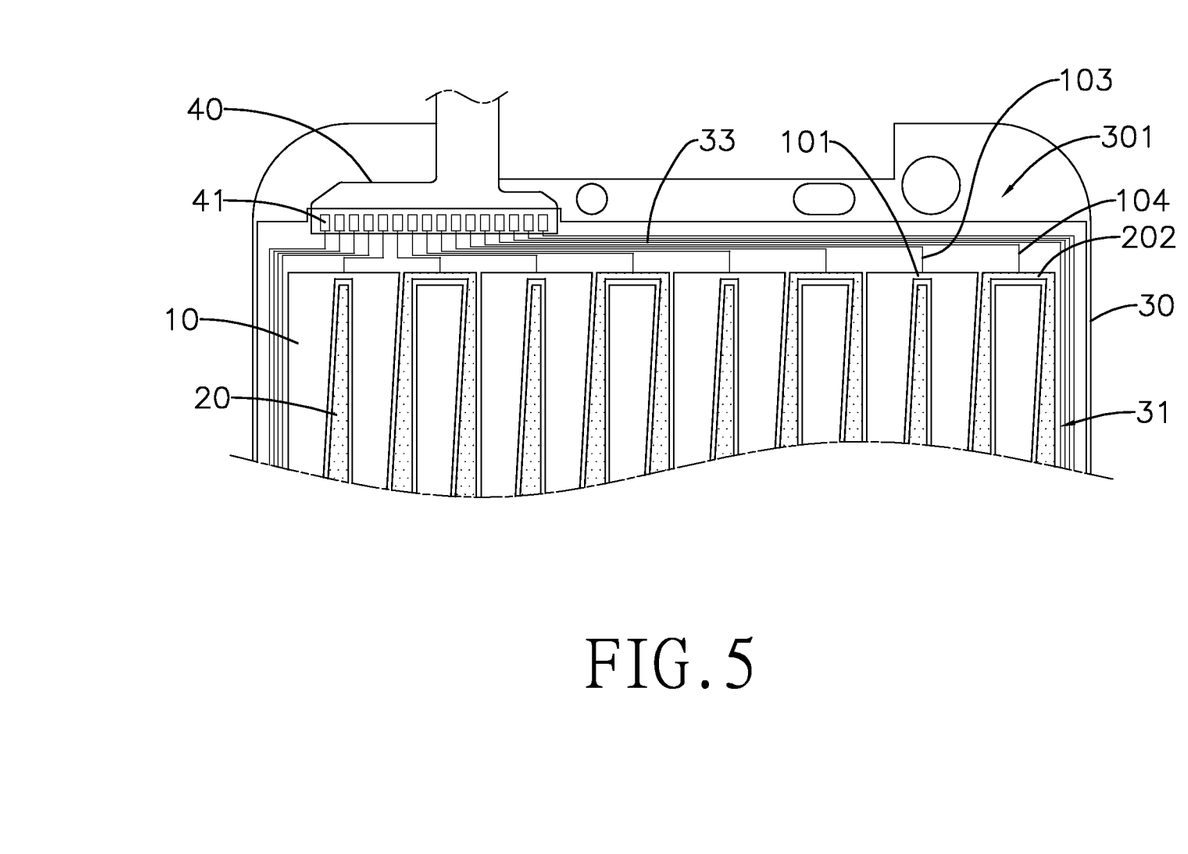
FIG. 5 is a partially enlarged schematic view of the capacitive touch panel in FIG. 4.
Figure 6:
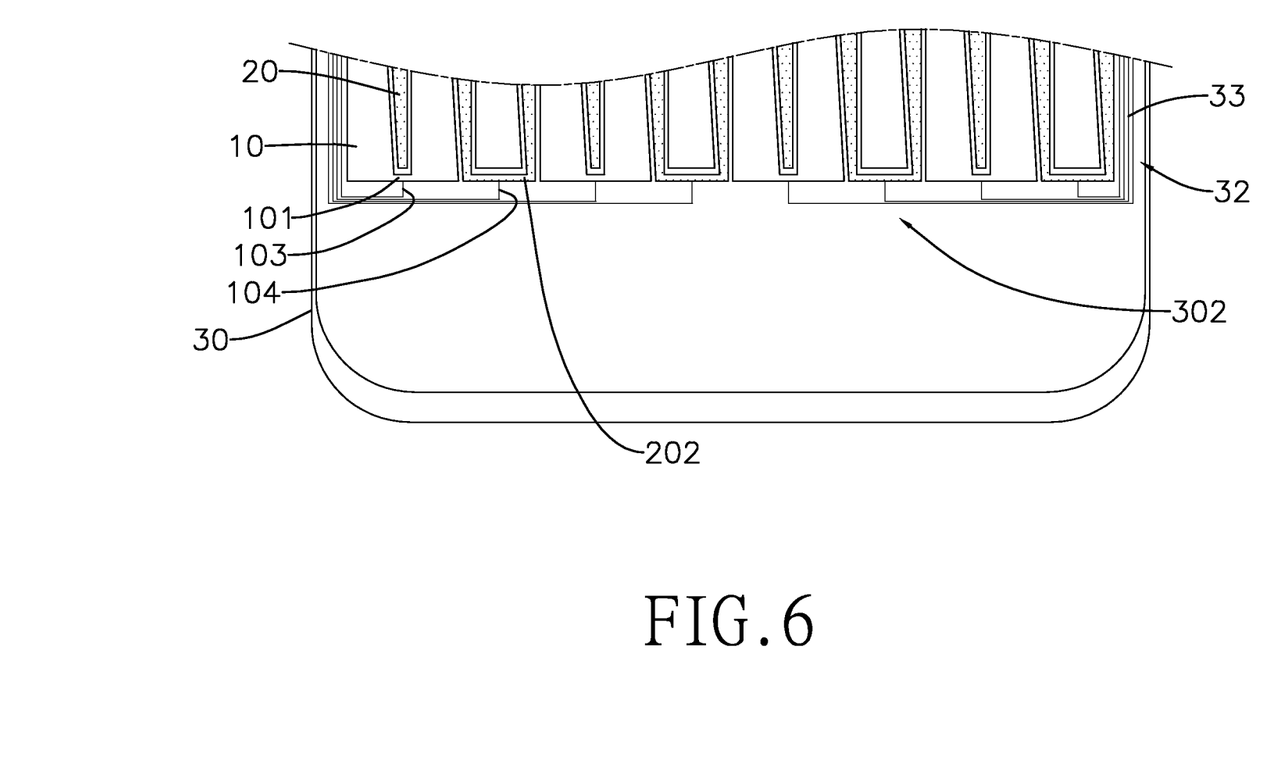
FIG. 6 is another partially enlarged schematic view of the capacitive touch panel in FIG. 4.

With reference to FIG. 5, in the first sensing area 31 the first connection segment 101 of the first electrode 10, the fourth connection segment 202 of the second electrode 20, and the signal terminals 103, 104 respectively formed on and extending upwards from the first connection segment 101 and the fourth connection segment 202 are formed on the first side portion 301 of the substrate 30. With reference to FIG. 6, the first electrodes 10 and the second electrodes 20 mounted in the second sensing area 32 are opposite to the corresponding first electrodes 10 and second electrodes 20 in the first sensing area 31. In the second sensing area 32 the first connection segment 101 of the first electrode 10, the fourth connection segment 202 of the second electrode 20, and the signal terminals 103, 104 respectively formed on and extending downwards from the first connection segment 101 and the fourth connection segment 202 are formed on the second side portion 302 of the substrate 30.

With further reference to FIG. 5, the control module 40 is mounted on a flexible printed circuit board, is located on the first side portion 301 of the substrate 30, and has multiple signal terminals 41. Each signal terminal 41 is connected to a corresponding one of the signal terminals 103, 104 of the first electrodes 10 and the second electrodes 20 in the first sensing area 31 and the second sensing area 32. To respectively connect the signal terminals 41 of the control module 40 to the corresponding signal terminals 103, 104 of the first electrodes 10 and the second electrodes 20 in the first sensing area 31 and the second sensing area 32, multiple transmission lines 33 are formed on the substrate 30 to surround the first sensing area 31 and the second sensing area 32 for connection between the signal terminals 41 of the control module 40 and the corresponding signal terminals 103, 104 of the first electrodes 10 and the second electrodes 20 in the first sensing area 31 and the second sensing area 32.

From the foregoing capacitive touch panel and the electrode couples thereof, the first electrode and the second electrode of each electrode couple is specially designed to provide symmetrical capacitance and resistance values such that the capacitive touch panel using the structure of the electrode couple has a stronger anti-interference capability against noise and an enhanced SNR.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electrode couple applied to a capacitive touch panel and comprising:
   a first electrode having:
      a first trace having a first end and a second end;
      a second trace having a first end and a second end, wherein the first end of the second trace is connected to the first end of the first trace; and
      a third trace having a first end and a second end, wherein the second end of the third trace is connected to the second end of the first trace; and
   a second electrode having:
      a fourth trace having a first end and a second end;
      a fifth trace having a first end and a second end, wherein the second end of the fifth trace is connected to the second end of the fourth trace; and
      a sixth trace having a first end and a second end, wherein the first end of the sixth trace is connected to the first end of the fourth trace;
   wherein the first trace, the second trace, the third trace of the first electrode and the fourth trace, the fifth trace and the sixth trace of the second electrode are alternately arranged in a way that the first ends of the first trace, the second trace, the third trace and the second ends of the fourth trace, the fifth trace and the sixth trace are located on a same side of the capacitive touch panel, and the second ends of the first trace, the second trace, the third trace and the first ends of the fourth trace, the fifth trace and the sixth trace are located on another same side of the capacitive touch panel.

2. The electrode couple as claimed in claim 1, wherein
   each of the first trace, the second trace and the third trace of the first electrode is triangular and progressively decreases in width from the first end to the second end thereof, and the first end thereof is a wide end and the second end thereof is a narrow end; and
   each of the fourth trace, the fifth trace and the sixth trace of the second electrode is triangular and progressively decreases in width from the first end to the second end thereof, and the first end thereof is a wide end and the second end thereof is a narrow end.

3. The electrode couple as claimed in claim 2, wherein
   the first trace of the first electrode is located between the second trace and the third trace of the first electrode; and
   the fifth trace of the second electrode is located between the fourth trace and the sixth trace of the second electrode.

4. The electrode couple as claimed in claim 2, wherein
   each of the first trace, the second trace and the third trace of the first electrode has a straight side and a sloped side, and the first trace, the second trace and the third trace are arranged side by side with the straight sides thereof parallel to one another; and
   each of the fourth trace, the fifth trace and the sixth trace of the second electrode has a straight side and a sloped side, and the fourth trace, the fifth trace and the sixth trace are arranged side by side with the straight sides thereof parallel to one another.

5. The electrode couple as claimed in claim 1, wherein
   the first end of the first trace of the first electrode is connected to the first end of the second trace of the first electrode through a first connection segment, and the first connection segment has a signal terminal formed thereon; and
   the second end of the first trace of the first electrode is connected to the second end of the third trace of the first electrode through a second connection segment.

6. The electrode couple as claimed in claim 5, wherein
   the first end of the fourth trace of the second electrode is connected to the first end of the sixth trace of the second electrode through a third connection segment;
   a second end of the fourth trace of the second electrode is connected to the second end of the fifth trace of the second electrode through a fourth connection segment, and the fourth connection segment has a signal terminal formed thereon; and
   the signal terminals of the first electrode and the second electrode are located on a same side of the capacitive touch panel.

7. The electrode couple as claimed in claim 1, the electrode coupled applied in a single layer capacitive touch panel, wherein the signal layer capacitive touch panel has a substrate with a surface, and the electrode couple is formed on the surface of the substrate.

8. A capacitive touch panel, comprising:
   a substrate having a first side portion;
   at least one electrode couple, each one of the at least one electrode couple having:

multiple first electrodes formed on the substrate and each first electrode having:
- a first trace having a wide end and a narrow end;
- a second trace having a wide end and a narrow end, wherein the wide end of the second trace is connected to the wide end of the first trace through a first connection segment; and
- a third trace having a wide end and a narrow end, wherein the narrow end of the third trace is connected to the narrow end of the first trace through a second connection segment; and multiple second electrodes formed on the substrate and each second electrode having:
- a fourth trace having a wide end and a narrow end;
- a fifth trace having a wide end and a narrow end, wherein the narrow end of the fifth trace is connected to the narrow end of the fourth trace through a fourth connection segment; and
- a sixth trace having a wide end and a narrow end, wherein the wide end of the sixth trace is connected to the wide end of the fourth trace through a third connection segment;

wherein the first trace, the second trace, the third trace of the first electrode and the fourth trace, the fifth trace and the sixth trace of the second electrode are alternately arranged, and the first connection segment and the fourth connection segment are located on the first side portion of the substrate and the second connection segment and the third connection segment are located on the substrate and are opposite to the first side portion of the substrate; and a control module having multiple signal terminals respectively and electrically connected to the first electrodes and the second electrodes of the at least one electrode couple.

9. The capacitive touch panel as claimed in claimed 8, wherein the substrate has multiple sensing areas, the at least one electrode couple includes multiple electrode couples, and each sensing area has a corresponding electrode couple formed thereon.

10. The capacitive touch panel as claimed in claimed 8, wherein
- the substrate is rectangular and has the first side portion formed along a width direction of the substrate; and
- the at least one electrode couple includes two electrode couples; and
- the sensing areas include a first sensing area and a second sensing area aligned in a length direction of the substrate, wherein each of the first sensing area and the second sensing area has one of the electrode couples formed thereon, the first connection segments of the first electrodes and the fourth connection segments of the second electrodes formed in the first sensing area are located on the first side portion of the substrate.

11. The capacitive touch panel as claimed in claimed 10, wherein
- the substrate has a second side portion formed along a length direction of the substrate; and
- the first connection segments of the first electrodes and the fourth connection segments of the second electrodes formed in the second sensing area are located on the second side portion of the substrate.

12. The capacitive touch panel as claimed in claimed 10, wherein
- the control module is mounted on a flexible printed circuit board, is located on the first side portion of the substrate, and has multiple signal terminals;
- each first electrode has a signal terminal and is formed on a corresponding first connection segment, each second electrode has a signal terminal formed on a corresponding fourth connection segment, and the signal terminals of the control module are respectively and electrically connected to the signal terminals of the first electrodes and the second electrodes formed on the first sensing area and the second sensing area.

13. The capacitive touch panel as claimed in claimed 12, wherein the substrate has multiple transmission lines formed on the substrate to surround the first sensing area and the second sensing area, and the transmission lines are respectively and electrically connected to the signal terminals of the first electrodes and the second electrodes formed on the first sensing area and the second sensing area.

14. The capacitive touch panel as claimed in claimed 8, wherein the capacitive touch panel is a single layer capacitive touch panel, the substrate has a surface, and the at least one electrode couple is formed on the surface of the substrate.

* * * * *